(12) United States Patent
Jun et al.

(10) Patent No.: US 11,260,748 B2
(45) Date of Patent: Mar. 1, 2022

(54) VEHICLE FRAME ASSEMBLY

(71) Applicant: Ford Global Technologies, LLC, Dearborn, MI (US)

(72) Inventors: GaRam Jun, Ann Arbor, MI (US); Joseph Hyde, Flint, MI (US); Harsha Hebbale, Berkley, MI (US); Matthew B. Makowski, Northville, MI (US); Joseph Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 16/565,834

(22) Filed: Sep. 10, 2019

(65) Prior Publication Data

US 2021/0070170 A1    Mar. 11, 2021

(51) Int. Cl.
| | |
|---|---|
| *B60K 17/00* | (2006.01) |
| *B60K 17/16* | (2006.01) |
| *B60K 15/03* | (2006.01) |
| *B60K 17/24* | (2006.01) |

(52) U.S. Cl.
CPC .............. *B60K 17/20* (2013.01); *B60K 15/03* (2013.01); *B60K 17/24* (2013.01)

(58) Field of Classification Search
CPC ...... B60K 17/20; B60K 17/24; B60K 17/165; B60K 15/063; B60K 2015/0675; B60K 2015/0638
See application file for complete search history.

(56) References Cited

U.S. PATENT DOCUMENTS

| | | | | |
|---|---|---|---|---|
| 1,834,879 | A * | 12/1931 | Trott | B60K 5/1216 |
| | | | | 180/291 |
| 2,828,095 | A * | 3/1958 | Beck | F16F 1/3732 |
| | | | | 248/612 |
| 2,843,214 | A * | 7/1958 | Muller | B60G 3/24 |
| | | | | 180/358 |
| 3,675,881 | A * | 7/1972 | Caldwell | F16F 1/3732 |
| | | | | 267/141.4 |
| 4,090,721 | A * | 5/1978 | Wedin | B60K 15/063 |
| | | | | 280/834 |
| 4,858,880 | A * | 8/1989 | Durand | B60G 99/004 |
| | | | | 248/635 |
| 5,036,943 | A * | 8/1991 | Kashiwagi | B60R 19/00 |
| | | | | 180/380 |
| 6,171,196 | B1 * | 1/2001 | Welschof | F16D 3/227 |
| | | | | 464/144 |
| 6,766,877 | B2 | 7/2004 | Blumke et al. | |

(Continued)

FOREIGN PATENT DOCUMENTS

| | | |
|---|---|---|
| JP | 4442404 B2 | 6/2006 |
| KR | 20030075028 A | 9/2003 |
| KR | 20030041493 A | 5/2009 |

*Primary Examiner* — Frank B Vanaman
(74) *Attorney, Agent, or Firm* — Frank A. MacKenzie; Bejin Bieneman PLC

(57) ABSTRACT

An assembly includes a vehicle frame having a crossmember defining a passage. The assembly includes a drive unit supported by the crossmember in the passage. The assembly includes a stabilizer fixed to the drive unit, the stabilizer permitting movement of the drive unit in a first direction relative to the passage and restricting movement of the drive unit in a second direction opposite the first direction.

19 Claims, 8 Drawing Sheets

(56) References Cited

U.S. PATENT DOCUMENTS

| | | | |
|---|---|---|---|
| 9,085,234 B2 | 7/2015 | Saneyoshi et al. | |
| 2002/0171012 A1* | 11/2002 | Boutin | B60K 17/24 248/60 |
| 2006/0027992 A1* | 2/2006 | Bordini | B60G 3/12 280/124.156 |
| 2013/0008735 A1* | 1/2013 | Hiramatsu | B62D 21/152 180/291 |

* cited by examiner

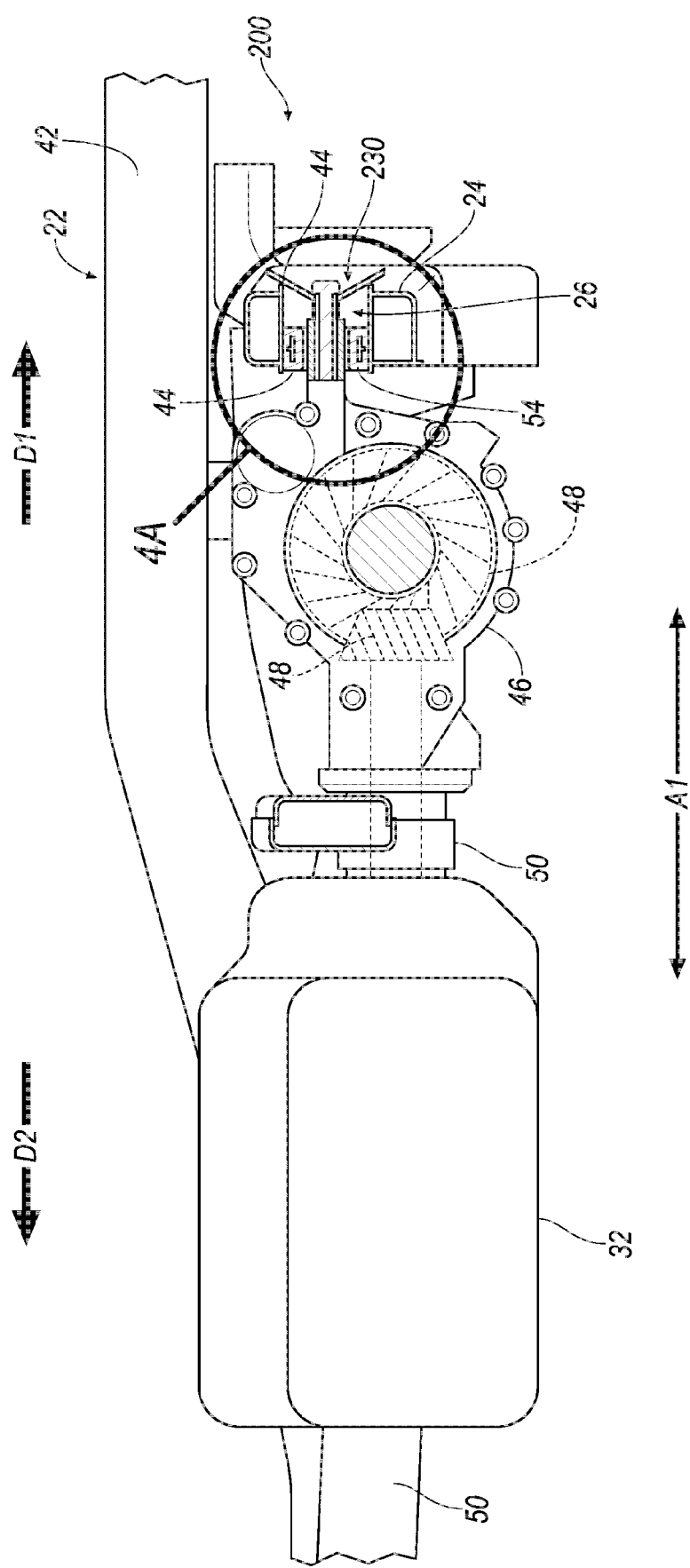

VEHICLE FRAME ASSEMBLY

BACKGROUND

A vehicle includes a frame. The frame may be of a unibody construction. In the unibody construction, a body of the vehicle, e.g., rockers, pillars, roof rails, etc., serve as the frame the body is unitary, i.e., a continuous one-piece unit. As another example, the frame may have a body-on-frame construction (also referred to as a cab-on-frame construction). In other words, the body and frame are separate components, i.e., are modular, and the body is supported on and affixed to the frame. Alternatively, the frame may have any suitable construction. The frame may be formed of any suitable material, for example, steel, aluminum, etc.

The frame supports other components of the vehicle, such as components of a propulsion system, e.g., a drive unit, a drive shaft, an energy storage device, etc. During an impact to the vehicle the components supported by the frame may be moved relative to the frame and each other.

BRIEF DESCRIPTION OF THE DRAWINGS

FIG. 4 is a side view of a portion the vehicle having an assembly for controlling movement of components of the vehicle with part of the assembly in cross section.

DETAILED DESCRIPTION

Figure 1:
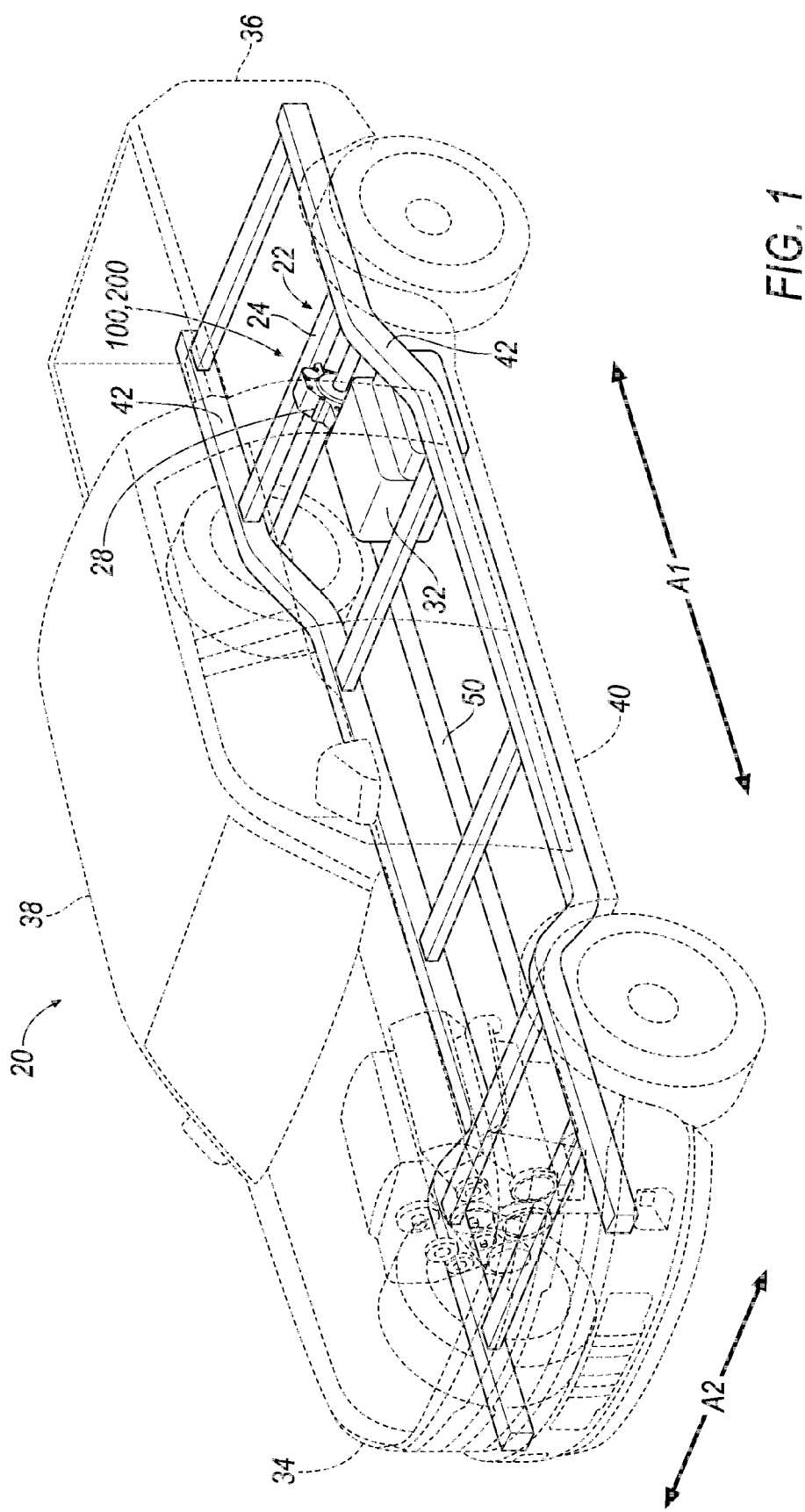
FIG. 1 is a perspective view of a vehicle.

An assembly includes a vehicle frame having a crossmember defining a passage. The assembly includes a drive unit supported by the crossmember in the passage. The assembly includes a stabilizer fixed to the drive unit, the stabilizer permitting movement of the drive unit in a first direction relative to the passage and restricting movement of the drive unit in a second direction opposite the first direction.

The assembly may include a drive shaft operatively coupled to the drive unit.

The passage may extend between open ends that are spaced along an axis that is perpendicular to the crossmember.

The vehicle frame may include frame rails, the crossmember fixed to the frame rails.

The assembly may include a bushing supporting the drive unit within the passage.

The drive unit may include a housing and a plurality of gears within the housing.

The drive unit may include a support shaft within the passage.

The assembly may include an energy storage device supported by the vehicle frame, the drive unit between the energy storage device and the crossmember.

The energy storage device may be a fuel tank.

The stabilizer may define an outer width greater than a diameter of the passage.

The stabilizer may include a sloped surface extending from within the passage to outside the passage.

The stabilizer may include a plurality of members extending radially outward.

Each of the members may be moveable from a contracted position to an expanded position, the contracted position defining a first width less than a diameter of the passage and the expanded position defining a second width greater than the diameter of the passage.

The stabilizer may include a spring urging at least one of the members from the contracted position to the expanded position.

The crossmember may maintain the stabilizer in the contracted position.

The drive unit may be forward of the crossmember.

The assembly may include an energy storage device forward of the drive unit.

The assembly the stabilizer may include a sloped surface extending from within the passage to outside the passage, the sloped surface extending rearward from the crossmember and radially outward relative to the passage.

With reference to the Figures, wherein like numerals indicate like parts throughout the several views, an assembly 100, 200 for controlling movement of components of a vehicle 20 includes a frame 22 having a crossmember 24 defining a passage 26. The assembly 100, 200 includes a drive unit 28 supported by the crossmember 24 in the passage 26. The assembly 100, 200 includes a stabilizer 130, 230 fixed to the drive unit 28, the stabilizer 130, 230 permitting movement of the drive unit 28 in a first direction D1 relative to the passage 26 and restricting movement of the drive unit 28 in a second direction D2 opposite the first direction D1.

Restricting movement of the drive unit 28 in the second direction D2 reduces likelihood of interference between the drive unit 28 and other components of the vehicle 20 and/or assembly 100, 200. For example, restricting movement of the drive unit 28 may decrease likelihood that the drive unit 28 will rebound after an impact to the vehicle 20, e.g., thereby reducing likelihood that the drive unit 28 will interfere with an energy storage device 32 of the vehicle 20 (such as a fuel tank).

The vehicle 20 may be any type of passenger or commercial automobile such as a car, a truck, a sport utility vehicle, a crossover vehicle, a van, a minivan, a taxi, a bus, etc.

The vehicle 20 defines a longitudinal axis A1, i.e., extending between a front 34 and a rear 36 of the vehicle 20. The vehicle 20 defines a cross-vehicle axis A2, i.e., extending between a right side 38 and a left side 40 of the vehicle 20. The longitudinal axis A1 and the cross-vehicle axis A2 are perpendicular to each other.

The frame 22 may be of a unibody construction. In the unibody construction, a body of the vehicle 20, e.g., rockers, pillars, roof rails, etc., serve as the frame 22, and the body is unitary, i.e., a continuous one-piece unit. As another example, the frame 22 may have a body-on-frame construction (also referred to as a cab-on-frame construction). In other words, the body and frame 22 are separate components, i.e., are modular, and the body is supported on and affixed to the frame 22. Alternatively, the frame 22 may have any suitable construction. The frame 22 may be formed of any suitable material, for example, steel, aluminum, etc.

The frame 22 supports vehicle 20 components, e.g., components of a drivetrain, a suspension, etc. The frame 22 may include beams, panels, etc. For example, the frame 22 includes the crossmember 24 and may include frame rails 42. The frame rails 22 are elongated along the longitudinal axis A1, e.g., between the front 34 and rear 36 of the vehicle 20.

The crossmember 24 supports one or more components of the vehicle 20, e.g., relative to the frame 22. The crossmember 24 may fixed to the frame rails 42 or other suitable structure of the frame 22, e.g., via weld, fastener, etc. The crossmember 24 is elongated along the cross-vehicle axis A2. In other words, the crossmember 24 is elongated between the right side 38 and the left side 40 of the vehicle 20. The crossmember 24 may be rectangular in cross section or have any suitable shape.

The crossmember 24 defines the passage 26. The passage 26 extends between open ends 44. The open ends 44 are spaced along an axis that is perpendicular to the crossmember 24. In other words, the open ends 44 are spaced from each other along, and the passage 26 extends along, the longitudinal axis A1.

The energy storage device 32 stores energy for operating the vehicle 20, e.g., for use by an internal combustion engine or electric motor to generate torque to apply to the tires of the vehicle 20. The energy storage device 32 may be a battery assembly that stores electricity. The battery may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs). The energy storage device 32 may be a fuel tank that stores fuel, e.g., gasoline, diesel, natural gas, etc.

The energy storage device 32 is supported by the frame 22. For example, the energy storage device 32 may be fixed to the frame 22 via fastener, bracket, etc. The energy storage device 32 may be forward of the drive unit 28. In other words, the energy storage device 32 may be between the front 34 of the vehicle 20 and the drive unit 28.

The drive unit 28 transfers torque, e.g., from the internal combustion engine or electric motor to one or more tires. The drive unit 28 may include a housing 46 and a plurality of gears 48 within the housing 46, illustrated in FIGS. 2, 3, and 4. For example, the housing 46 may define a chamber and the gears 48 may be in the chamber. The gears 48 may be reduction gears that reduce an output rotational speed and increase an output torque compared to a rotational speed and torque provided to the drive unit 28 from the engine or motor, e.g., via a drives haft 50. The gears 48 may be differential gears, e.g., that permit varied rotational speed between a tire on the right side 38 of the vehicle 20 and a tire on the left side 40 of the vehicle 20.

The drive unit 28 may include a support shaft 52 that supports the drive unit 28 relative to the frame 22, e.g., relative to the crossmember 24. The support shaft 52 may extend transversely from the housing 46. The support shaft 52 may be elongated along the longitudinal axis A1. The support shaft 52 may be fixed to the housing 46, e.g., via fastener, weld, etc. The support shaft 52 and the housing 46 may be monolithic, i.e., a one-piece unit without any fasteners, joints, welding, adhesives, etc., fixing the support shaft 52 to the housing 46.

The drive unit 28 is supported by the crossmember 24 in the passage 26. For example, the support shaft 52 may be within the passage 26. For example, the support shaft 52 may extend from the housing 46 through one of the open ends 44 and into the passage 26. A bushing 54 may support the drive unit 28 within the passage 26. For example, the bushing 54 may support the support shaft 52 and abut an inside surface 56 of the passage 26, illustrated in FIGS. 2A, 3A, and 4A. The support shaft 52 and/or bushing 54 may be friction fit in the passage 26, e.g., such that a threshold amount of force may be required to move the support shaft 52 along the passage 26. The drive unit 28 may be between the energy storage device 32 and the crossmember 24, e.g., relative to the longitudinal axis A1. The drive unit 28 may be forward of the crossmember 24. In other words, the drive unit 28 may be between the front 34 of the vehicle 20 and the crossmember 24 relative to the longitudinal axis A1.

The drive shaft 50 may transfer torque from the engine or motor to the drive unit 28. The drive shaft 50 may be elongated along the longitudinal axis A1. The drive shaft 50 may be a metal shaft, or other suitable material or structure. The drive shaft 50 may be operatively coupled to the drive unit 28, e.g., such that torque from the drive shaft 50 is transferred to the gears 48 of the drive unit 28. The drive shaft 50 may be operatively coupled to the motor or the engine, e.g., such that torque from an output shaft of the motor or engine is transferred to the drive shaft 50. The drive shaft 50 may be coupled to the engine, motor, and/or drive unit 28 via universal joint, torque converter, transmission, or other suitable structure.

The stabilizer 130, 230 permits movement of the drive unit 28 in the first direction D1 relative to the passage 26. The first direction D1 is a rearward direction, e.g., along the longitudinal axis A1 and toward the rear 36 of the vehicle 20. The stabilizer 130, 230 restricts movement of the drive unit 28 in the second direction D2 opposite the first direction D1. The second direction D2 is a forward direction, e.g., along the longitudinal axis A1 and toward the front 34 of the vehicle 20. The stabilizer 130, 230 is fixed to the drive unit 28. For example, the stabilizer 130, 230 may be fixed to the support shaft 52 via fastener, weld, etc. The stabilizer 130, 230 may include a plurality of members 158, 258 that extend radially outward, e.g., relative to the longitudinal axis A1 and away from the support shaft 52. The stabilizer 130, 230 may define an outer width W1 than greater than a diameter W2 of the passage 26. The outer width W1 may be defined by ends 60 of the members 158, 258, e.g., of members 158, 258 that are opposite each other. The diameter W2 may be defined by the inside surface 56 of the passage 26.

Figure 2:
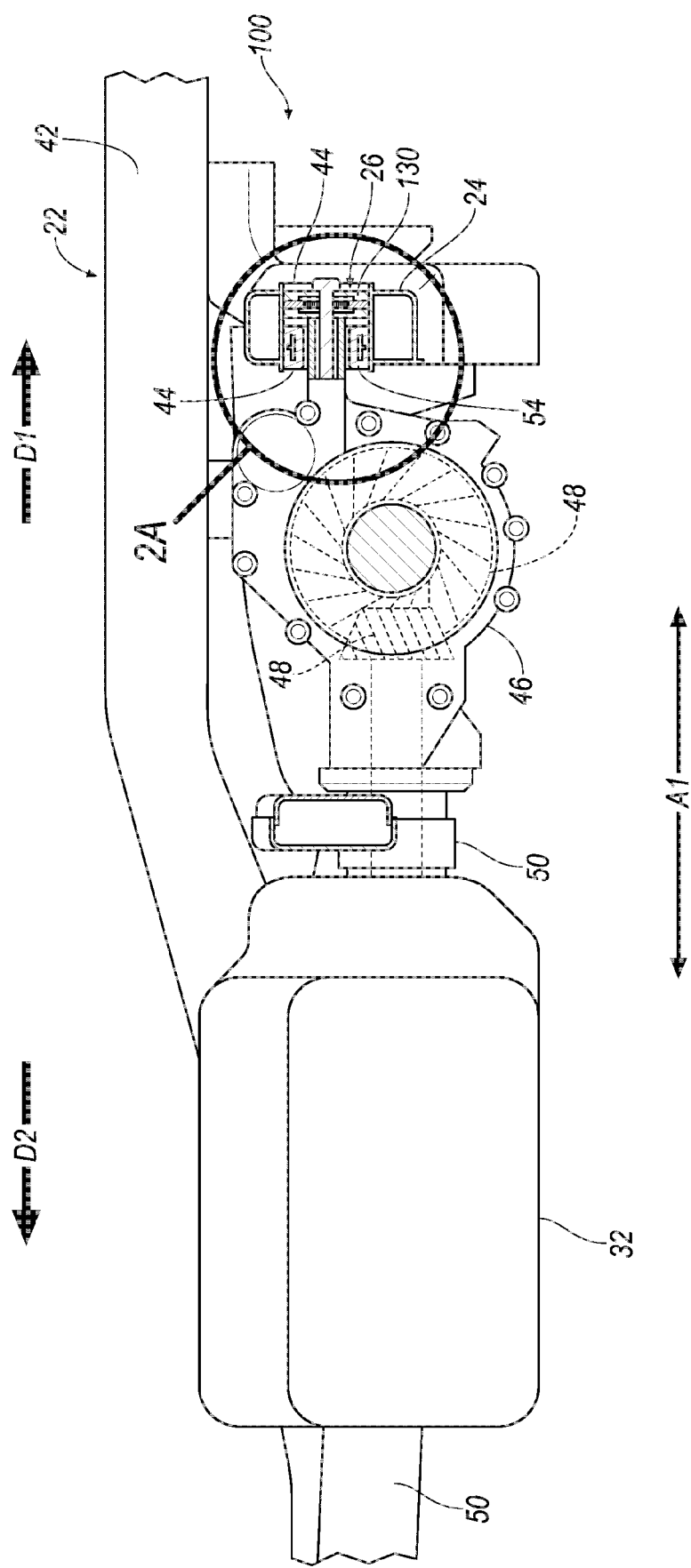
FIG. 2 as a side view of a portion the vehicle having an assembly for controlling movement of components of the vehicle, with part of the assembly in cross section.
Figure 2A:
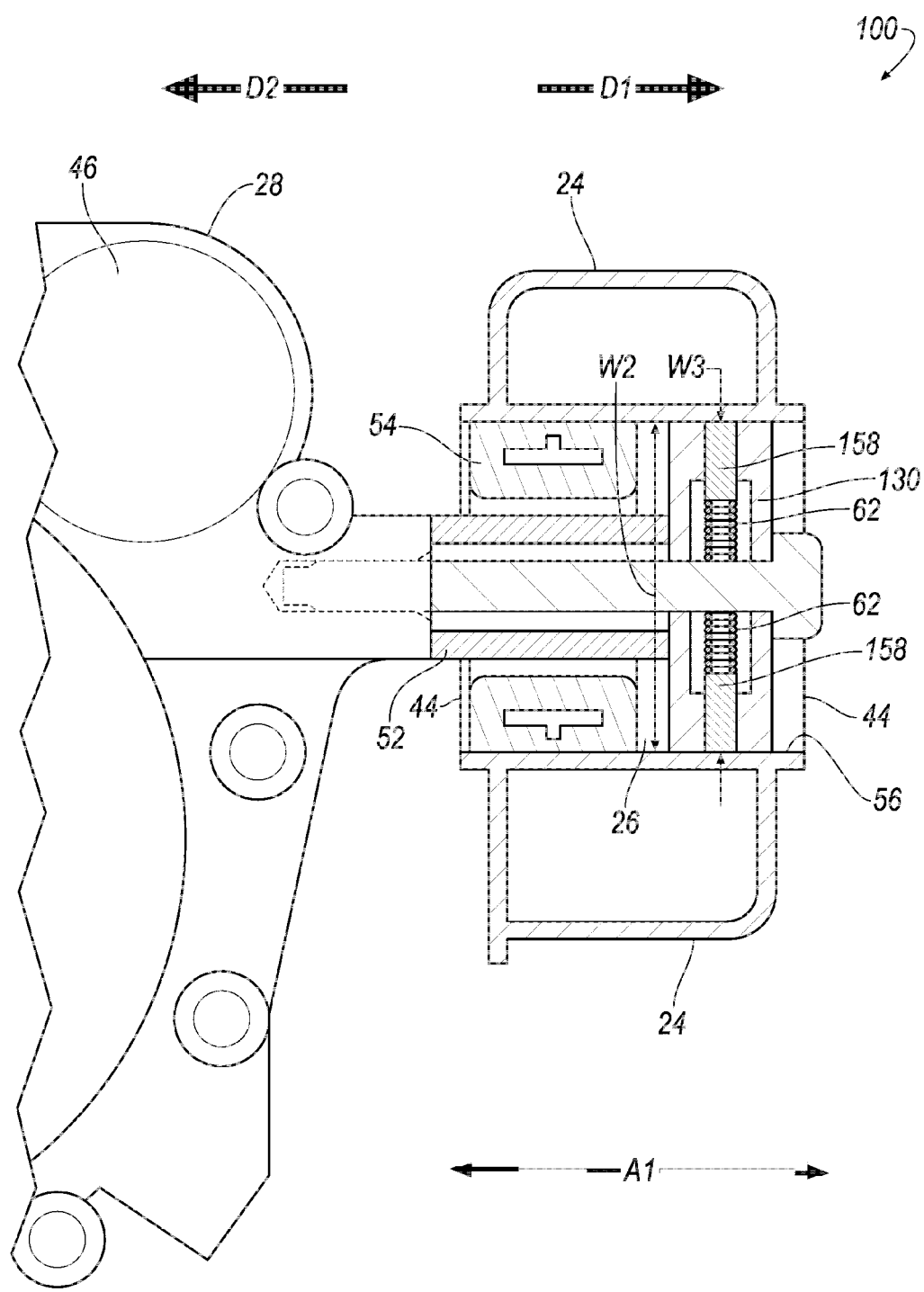
FIG. 2A is a close-up view of the assembly for controlling movement of components of the vehicle of FIG. 2.
Figure 3:
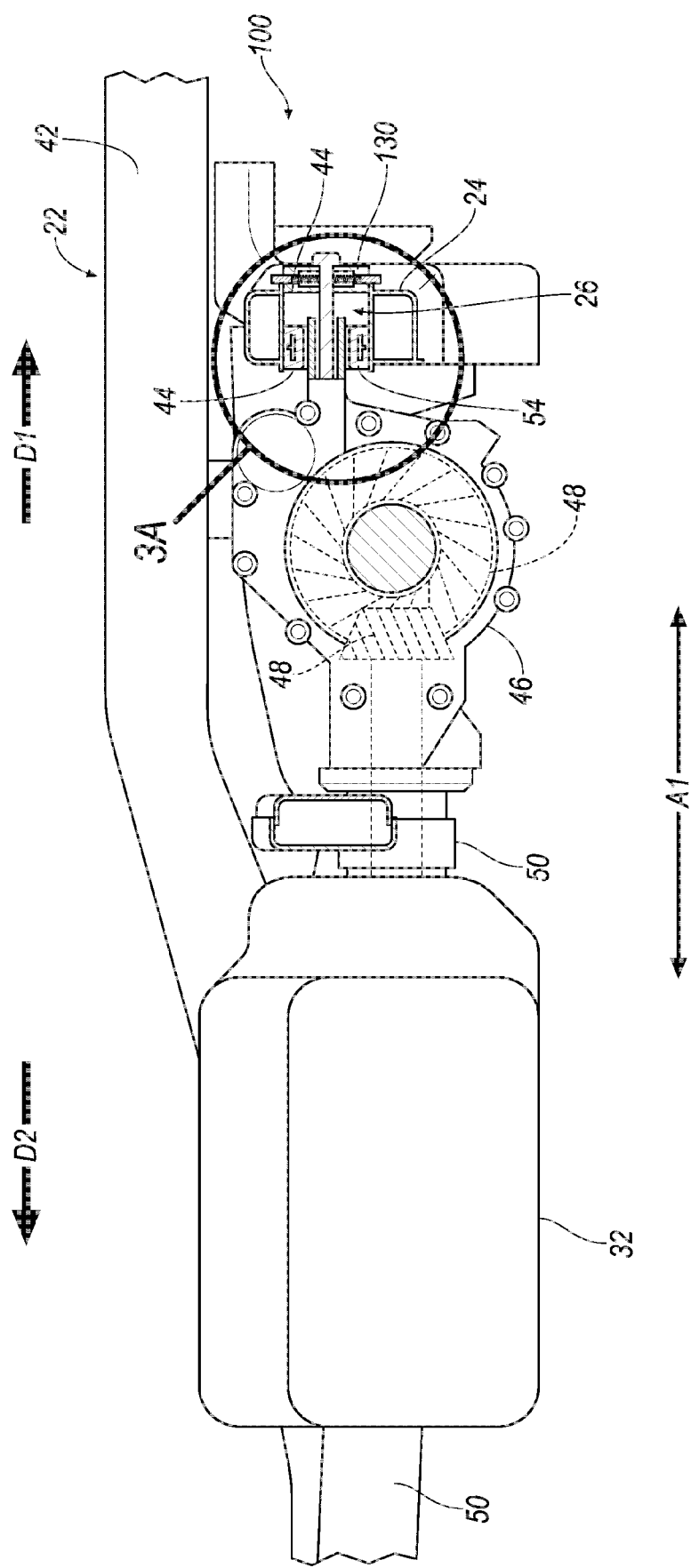
FIG. 3 as a side view of the portion the vehicle having the assembly for controlling movement of components of FIG. 2 after a front impact to the vehicle.
Figure 3A:
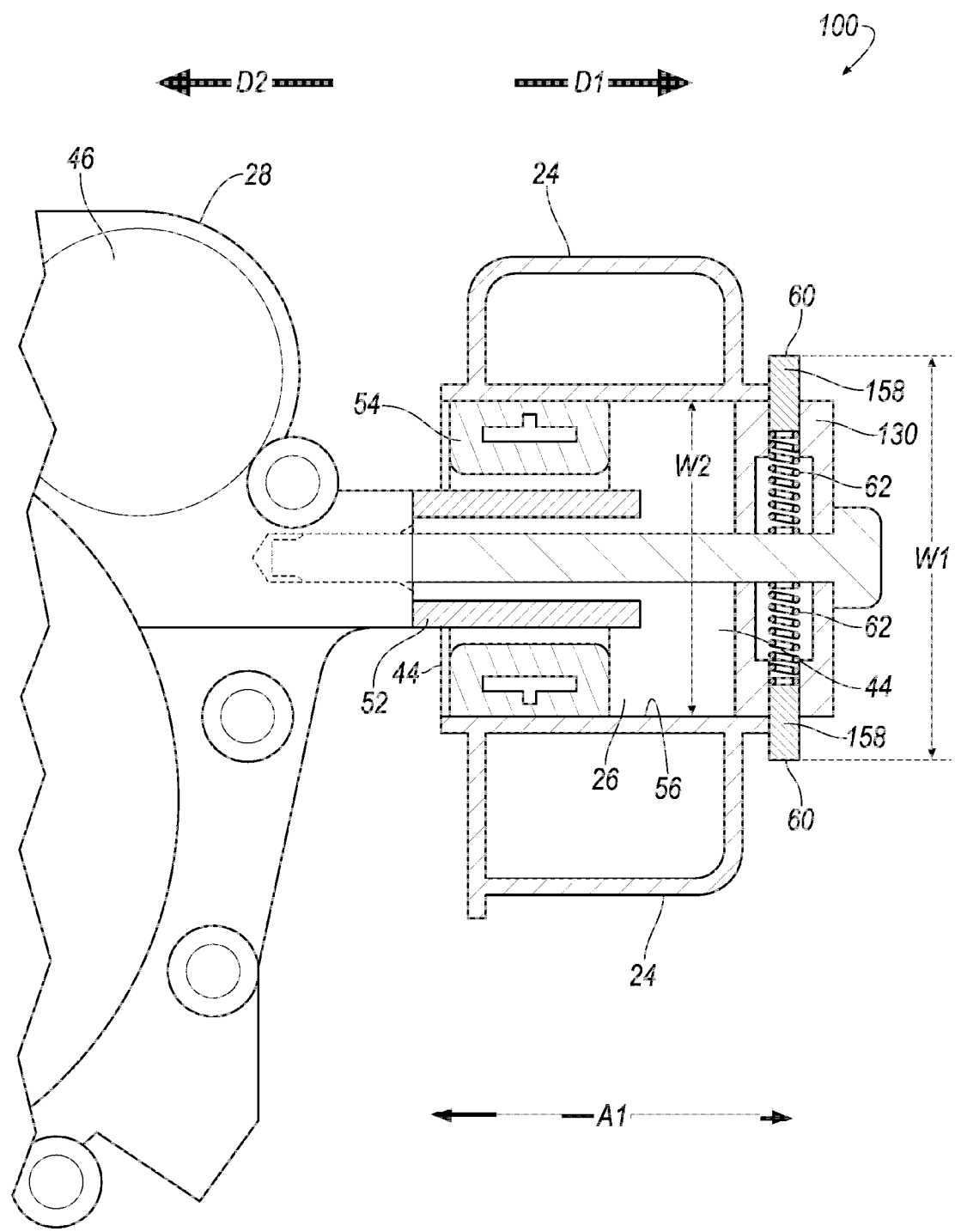
FIG. 3A is a close-up view of the assembly for controlling movement of components the vehicle of FIG. 3.

With reference to FIGS. 2-3A, each of the members 158 are moveable from a contracted position, illustrated in FIGS. 2 and 2A, to an expanded position, illustrated in FIGS. 3 and 3A. The contracted position may define a first width W3, e.g., between ends 60 of the members 158 that is equal to or less than the diameter W2 of the passage 26. The expanded position may define a second width W1, e.g., between ends of the members 158, 258, that is greater than the diameter of the passage 26. The second width may be the outer width W1.

The stabilizer 130 may include a spring 62 that urges at least one of the members 158 from the contracted position to the expanded position. For example, opposing members 158 may be slidably supported to move radially toward and away from the support shaft 52. The spring 62 may be between such members 158 and urge the members 158 away from the support shaft 52. As another example, the one of the members 158 may be slidably supported to move toward and away from the support shaft 52. The spring 62 may be between the member 158 and the support shaft 52 and urge the member 158 away from the support shaft 52. The assembly 100 may include other suitable structure that urges the members 158 from the contracted position to the expanded position.

The crossmember 24 may maintain the stabilizer 130 in the contracted position. For example, members 158 in the contracted position may be in the passage 26. The ends 60 of the members 158 may abut the inside surface 56 of the passage 26. Normal force between the inside surface 56 and the ends 60 of the members 158 may maintain the members 158 in the contacted position.

During normal operation of the vehicle 20 the members 158 may be in the contracted position within the passage 26, as illustrated in FIGS. 2 and 2A. In the event of a front impact to the vehicle 20, the drive unit 28 and stabilizer 130 may be urged rearward relative to the longitudinal axis A1. The members 158 may be urged rearward and outside the passage 26, as illustrated in FIGS. 3 and 3A. Once outside the passage 26, the members 158 may be urged to the expanded position. Subsequent the rearward movement of the drive unit 28, rebound forces and momentum may urge the drive unit 28 forward, e.g., toward the front 34 of the vehicle 20. The members 158 in the expanded position may abut the crossmember 24 with the larger diameter W1 of the members 158, 258 inhibiting reentry into the smaller diameter W2 of the passage 26, thereby restricting forward movement of the drive unit 28.

Figure 4A:
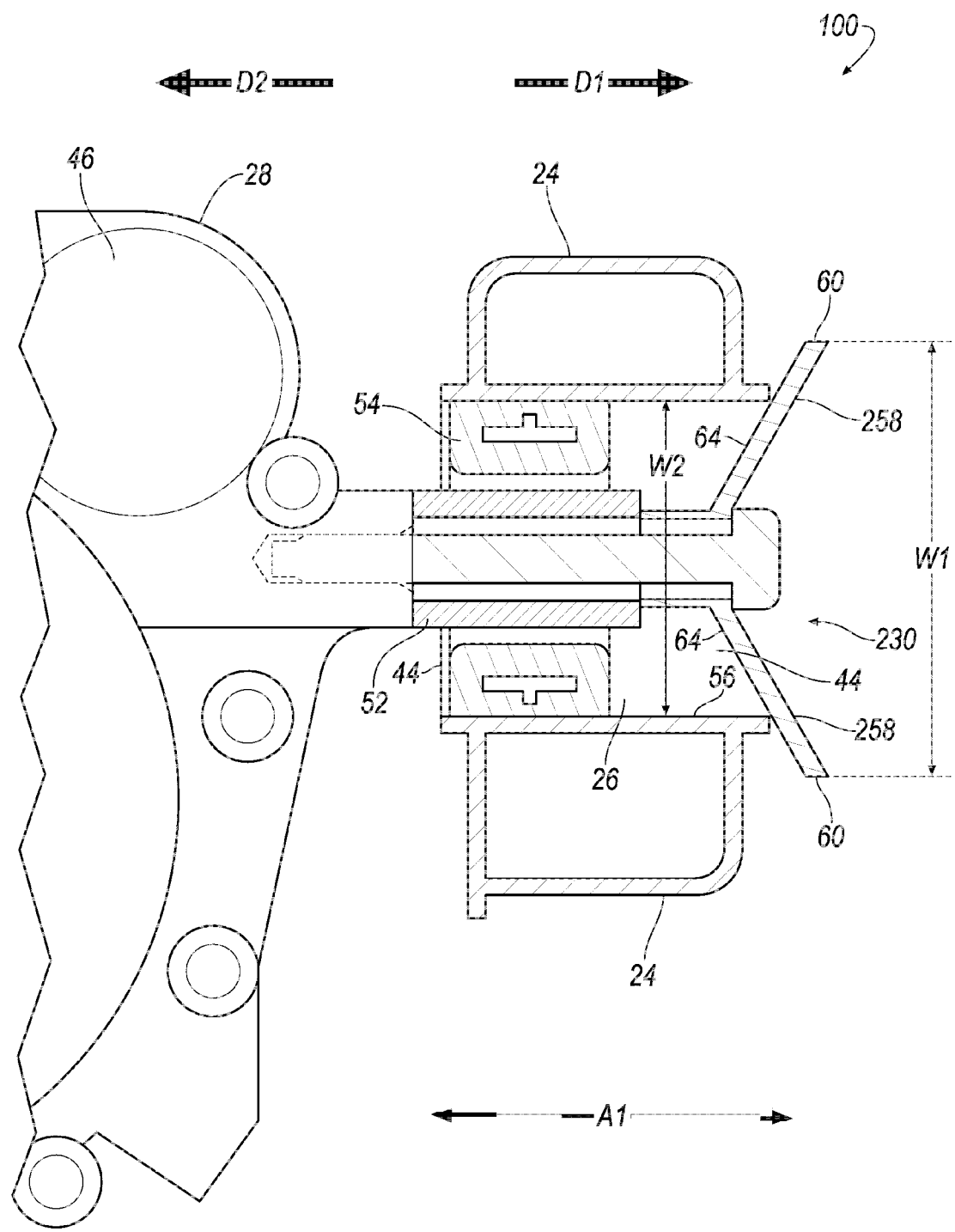
FIG. 4A is a close-up view of the assembly for controlling movement of components the vehicle of FIG. 4.
Figure 5:
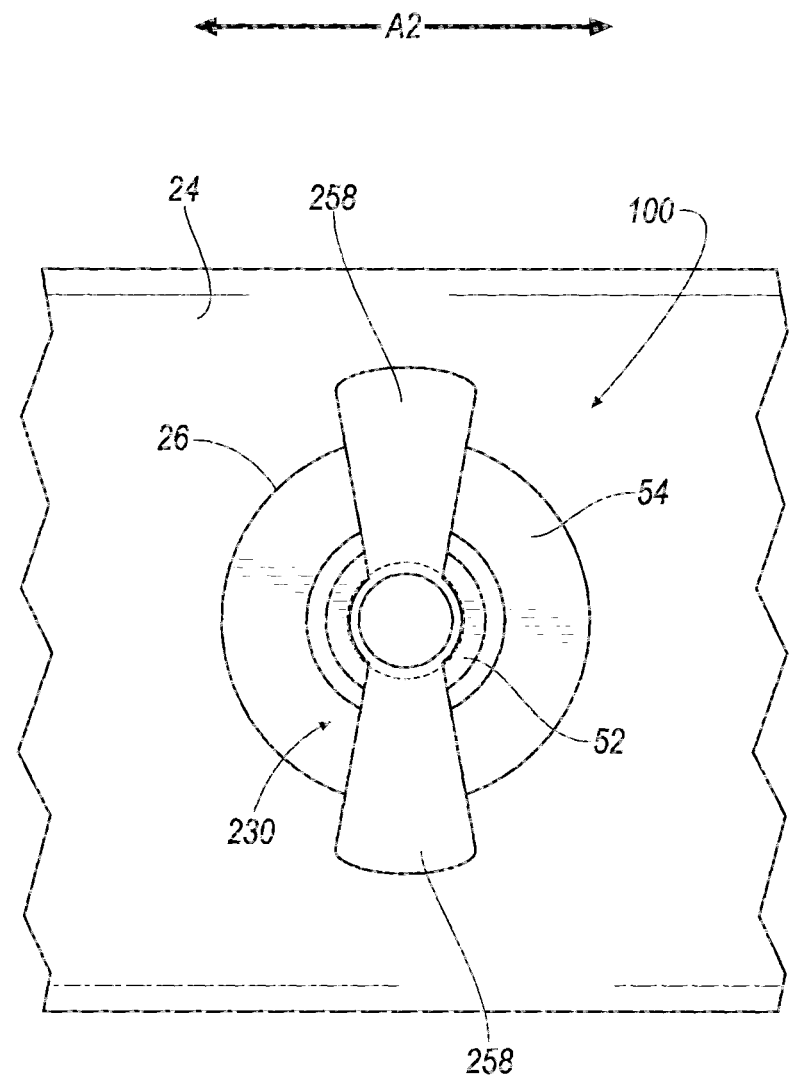
FIG. 5 is a rear view of a portion the vehicle having the assembly for controlling movement of components of the vehicle of FIG. 4.

With reference to FIGS. 4-5, the stabilizer 230 includes a sloped surface 64 extending from within the passage 26 to outside the passage 26, illustrated in FIG. 4A. For example, the sloped surface 64 may extend rearward from the crossmember 24 and radially outward relative to the passage 26. The sloped surface 64 may be defined by one or more of the members 258. As an alternative to the members 258 defining the sloped surface 64, the stabilizer 230 may be generally conical with an outer surface that defines sloped surface 64.

During normal operation of the vehicle 20 the sloped surface 64 may abut the crossmember 24, e.g., at the open end 44 of the passage 26 closer to the rear 36 of the vehicle 20. In the event of a front impact to the vehicle 20, the drive unit 28 and the stabilizer 230 may be urged rearward relative to the longitudinal axis A1 and the sloped surface 64 may be spaced from the passage 26. Subsequent the rearward movement of the drive unit 28, rebound forces and momentum may urge the drive unit 28 forward, e.g., toward the front 34 of the vehicle 20. The sloped surface 64 may again abut the crossmember 24, thereby restricting forward movement of the drive unit 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a vehicle frame having a crossmember defining a passage;
a bushing within the passage;
a drive unit supported by the bushing in the passage; and
a stabilizer fixed to the drive unit, the stabilizer defining an outer width greater than a diameter of the passage, the stabilizer permitting movement of the drive unit in a first direction relative to the passage and restricting movement of the drive unit in a second direction opposite the first direction, the stabilizer including a sloped surface extending from within the passage to outside the passage, the sloped surface extending rearward from the crossmember and radially outward relative to the passage.

2. The assembly of claim 1, further comprising a drive shaft operatively coupled to the drive unit.

3. The assembly of claim 1, wherein the passage extends between open ends that are spaced along an axis that is perpendicular to the crossmember.

4. The assembly of claim 1, wherein the vehicle frame includes frame rails, the crossmember fixed to the frame rails.

5. The assembly of claim 1, wherein the drive unit includes a housing and a plurality of gears within the housing.

6. The assembly of claim 1, wherein the drive unit includes a support shaft within the passage.

7. The assembly of claim 1, further comprising an energy storage device supported by the vehicle frame, the drive unit between the energy storage device and the crossmember.

8. The assembly of claim 7, wherein the energy storage device is a fuel tank.

9. The assembly of claim 1, wherein the stabilizer includes a conical surface extending from within the passage to outside the passage.

10. The assembly of claim 1, wherein the drive unit is forward of the crossmember.

11. The assembly of claim 1, further comprising an energy storage device forward of the drive unit.

12. An assembly, comprising:
a vehicle frame having a crossmember defining a passage;
a drive unit supported by the crossmember in the passage; and
a stabilizer fixed to the drive unit, the stabilizer permitting movement of the drive unit in a first direction relative to the passage and restricting movement of the drive unit in a second direction opposite the first direction, the stabilizer including a plurality of members extending radially outward, each member of the plurality members moveable from a contracted position to an expanded position, the contracted position defining a first width equal to or less than a diameter of the passage and the expanded position defining a second width greater than the diameter of the passage.

13. The assembly of claim 12, wherein the stabilizer includes a spring urging at least one of the members from the contracted position to the expanded position.

14. The assembly of claim 12, wherein crossmember maintains the stabilizer in the contracted position.

15. An assembly, comprising:
a vehicle frame having a crossmember defining a passage;
a bushing within the passage;
a drive unit supported by the bushing in the passage; and
a stabilizer fixed to the drive unit, the stabilizer defining an outer width greater than a diameter of the passage, the stabilizer permitting movement of the drive unit in a first direction relative to the passage and restricting movement of the drive unit in a second direction opposite the first direction, the stabilizer including a pair of members extending radially outward opposite each other.

16. The assembly of claim 15, wherein each of the members are moveable from a contracted position to an expanded position, the contracted position defining a first width equal to or less than a diameter of the passage and the expanded position defining the outer width greater than the diameter of the passage.

17. The assembly of claim 16, wherein the stabilizer includes a spring urging at least one of the members from the contracted position to the expanded position.

18. The assembly of claim 16, wherein the crossmember maintains the stabilizer in the contracted position.

19. The assembly of claim 15, wherein the outer width of the stabilizer is defined by distal ends of the pair of members.

\* \* \* \* \*